US009666111B2

(12) United States Patent
Yao et al.

(10) Patent No.: US 9,666,111 B2
(45) Date of Patent: May 30, 2017

(54) IN-CELL TOUCH PANEL AND VOLTAGE TESTING METHOD THEREOF

(71) Applicants: Shanghai Tianma Micro-Electronics Co., Ltd., Shanghai (CN); Tianma Micro-Electronics Co., Ltd., Shenzhen (CN)

(72) Inventors: Qijun Yao, Shanghai (CN); Conghua Ma, Shanghai (CN)

(73) Assignees: SHANGHAI TIANMA MICRO-ELECTRONICS CO., LTD., Shanghai (CN); TIANMA MICRO-ELECTRONICS CO., LTD., Shenzhen (CN)

(*) Notice: Subject to any disclaimer, the term of this patent is extended or adjusted under 35 U.S.C. 154(b) by 17 days.

(21) Appl. No.: 14/135,509

(22) Filed: Dec. 19, 2013

(65) Prior Publication Data

US 2014/0361786 A1 Dec. 11, 2014

(30) Foreign Application Priority Data

Jun. 9, 2013 (CN) .......................... 2013 1 0232233

(51) Int. Cl.
*G09G 3/00* (2006.01)
*G06F 3/041* (2006.01)

(52) U.S. Cl.
CPC .............. *G09G 3/006* (2013.01); *G06F 3/041* (2013.01); *G06F 3/0412* (2013.01); *G06F 3/0416* (2013.01)

(58) Field of Classification Search
CPC ....... G09G 3/006; G06F 3/0416; G06F 3/041; G06F 3/0412

USPC ............................................. 324/537; 349/12
See application file for complete search history.

(56) References Cited

U.S. PATENT DOCUMENTS

| 5,060,116 A * | 10/1991 | Grobman | H01L 23/5382 174/254 |
| 8,624,856 B2 * | 1/2014 | Kim | G02F 1/13338 345/173 |
| 2002/0075439 A1 * | 6/2002 | Uehara | G02F 1/1309 349/149 |
| 2010/0085320 A1 | 4/2010 | Kuwajima et al. | |
| 2011/0242027 A1 | 10/2011 | Chang | |

(Continued)

FOREIGN PATENT DOCUMENTS

| CN | 102595774 A | 7/2012 |
| CN | 102637100 A | 8/2012 |
| WO | 2013018592 A1 | 2/2013 |

OTHER PUBLICATIONS

Partial European Search Report for European Application No. 14150147, mailed Oct. 31, 2014, 6 pages total.

*Primary Examiner* — Son Le
*Assistant Examiner* — Akm Zakaria
(74) *Attorney, Agent, or Firm* — Alston & Bird LLP (57) ABSTRACT

An in-cell touch panel is disclosed. The in-cell touch panel includes an array substrate, and a plurality of signal lines arranged at one side of the array substrate. Each signal line includes a transient lead and includes one of a display pin and a touch pin connected to the transient lead. The in-cell touch panel also includes an insulating layer covering the transient lead, and a first wire formed on the insulating layer of at least one transient lead, where the first wire is electrically connected with the transient lead via a first through-hole in the insulating layer.

13 Claims, 6 Drawing Sheets

(56) References Cited

U.S. PATENT DOCUMENTS

| | | | |
|---|---|---|---|
| 2013/0077034 A1* | 3/2013 | Jung | G02F 1/1345 349/122 |
| 2013/0248863 A1* | 9/2013 | Tang | H01L 22/30 257/48 |
| 2014/0124347 A1* | 5/2014 | Jiang | G06F 3/041 200/5 A |
| 2014/0198268 A1 | 7/2014 | Sugita et al. | |

* cited by examiner

IN-CELL TOUCH PANEL AND VOLTAGE TESTING METHOD THEREOF

CROSS-REFERENCES TO RELATED APPLICATIONS

This application claims the benefit of priority to Chinese Patent Application No. 201310232233.X, filed with the Chinese Patent Office on Jun. 9, 2013 and entitled "IN-CELL TOUCH PANEL AND VOLTAGE TESTING METHOD THEREOF", the contents of which is incorporated herein by reference in its entirety.

BACKGROUND OF THE INVENTION

For the existing in-cell touch panel, a tested flexible printed circuit (FPC) pre-bonding method is usually adopted to perform voltage testing.

Figure 1:
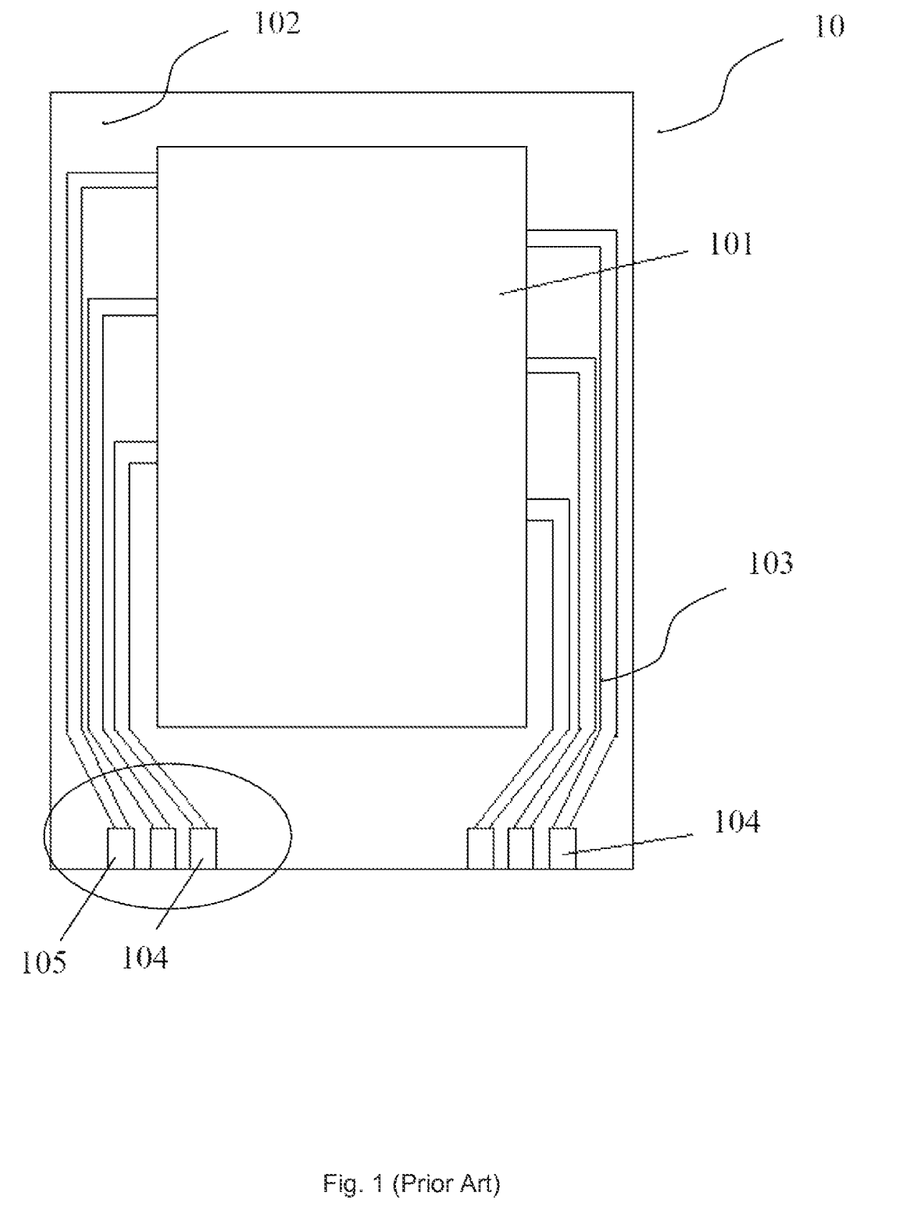
FIG. 1 is a top view of an in-cell touch panel in the prior art.
Figure 2:
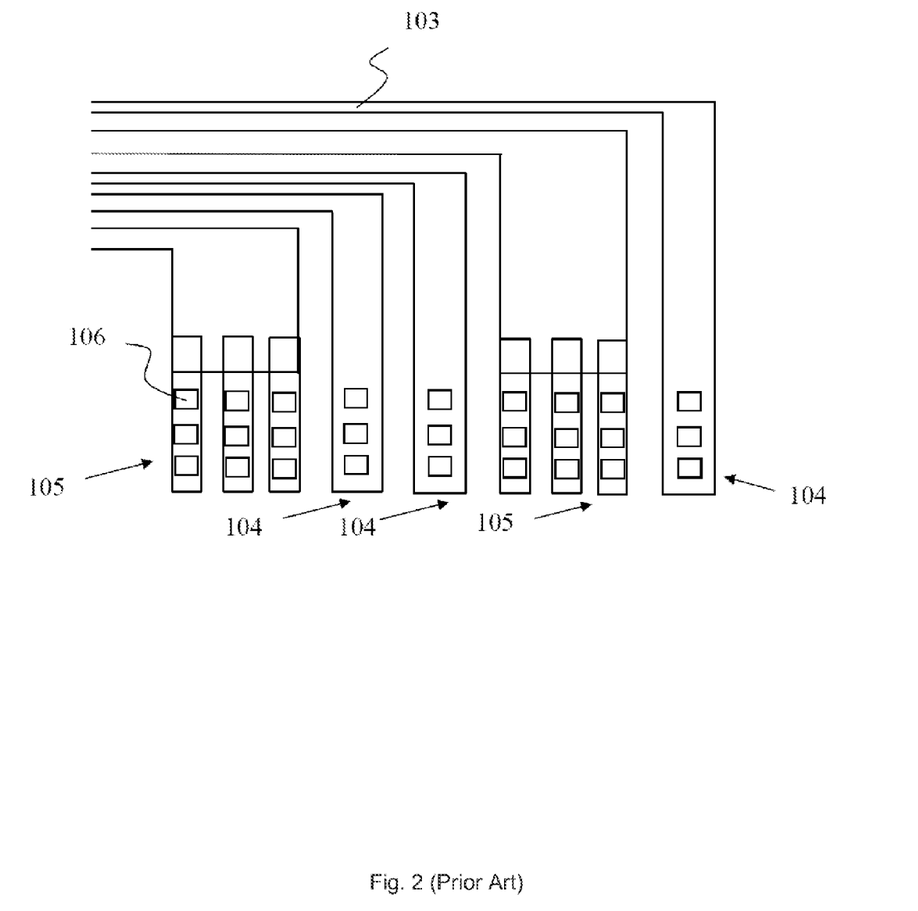
FIG. 2 is a partial enlarged view of the pin portion of FIG. 1.

Reference is made to FIG. 1. An in-cell touch panel 10 includes an array substrate 102. The array substrate 102 includes a display region 101, and multiple signal lines are formed on the array substrate 102. The signal line includes a transient lead 103 formed at the periphery of the display region and pins connected correspondingly with the transient lead 103. Reference is further made to FIG. 2, which is an enlarged view of the pins of FIG. 1. The pins include touch pins 104 and display pins 105, which are respectively connected with corresponding transient leads 103. The transient lead 103 includes a metal electrode, an insulating layer formed on the metal electrode, and a second wire formed on the insulating layer by depositing material such as indium tin oxide (ITO). The second wire is electrically connected with the transient lead 103 via a second through-hole 106 in the insulating layer. The second through-hole 106 is located above the metal electrode. The touch pins 104 and the display pins 105 are arranged at intervals on the same level. Before the array substrate is crimped to the flexible printed circuit (FPC), there is a need to use a test board to perform the voltage testing on all touch pins 104, determine whether there is a problem of short circuit, open circuit, weak connection and the like in the touch pins according to a detected capacitance value, and perform the subsequent processes after the test is passed. Since the touch pins 104 are spaced by the display pins 105, each of the detection portions of the test board needs to correspond to each of the individual touch pins 104 one-to-one. Moreover, when the detection portion of the test board is pressed onto the touch pins 104, the detection portion should not contact with the display pins 105 around the touch pins 104, therefore, the alignment of the detection portion and the touch pin 104 is very difficult and a window for testing is very small.

Generally, in order to make the testing become simpler, the touch pins 104 are usually widened in the design stage. However, because the size of the touch pins 104 is too small, even if they are widened, only a width in an order of several hundreds of microns can be achieved in consideration of size limitations such as the gap between the pin and the border of the screen. Specifically, the width of the touch pin 104 is very small, which is typically about 80 µm; and the gap between the touch pins 104 is also small, which is typically about 40 µm. Moreover, due to the existence of load capacitance, the display pin 105 has a different voltage resistance from the touch pin 104. Therefore, when testing the FPC, it is unable to test multiple adjacent touch pins at the same time. Moreover, there is a need to strictly align with each touch pin 104 while pre-bonding the FPC, which results in a difficult operation and a low testing accuracy. Besides, the existing testing fixture is cumbersome and is unable to be used widely.

BRIEF SUMMARY OF THE INVENTION

One inventive aspect is an in-cell touch panel. The in-cell touch panel includes an array substrate, and a plurality of signal lines arranged at one side of the array substrate. Each signal line includes a transient lead and includes one of a display pin and a touch pin connected to the transient lead. The in-cell touch panel also includes an insulating layer covering the transient lead, and a first wire formed on the insulating layer of at least one transient lead, where the first wire is electrically connected with the transient lead via a first through-hole in the insulating layer.

Another inventive aspect is a voltage testing method for an in-cell touch panel. The method includes providing a plurality of first test boards, the first test boards each including a first detection portion. The method also includes connecting the first detection portion with the first wire on a corresponding transient lead, and applying a signal to the first wire to perform voltage testing.

DETAILED DESCRIPTION OF THE INVENTION

To make the above object, features and advantages of the invention more obvious and easy to be understood, specific embodiments of the invention will be illustrated in detail hereinafter in conjunction with the drawings.

Specific details will be set forth in the following descriptions for sufficient understanding of the invention. However, the invention can also be implemented in other ways different from the way described herein, and similar extensions can be made by those skilled in the art without departing from the spirit of the invention. Therefore, the invention is not limited to specific embodiments disclosed hereinafter.

One Embodiment

Figure 3:
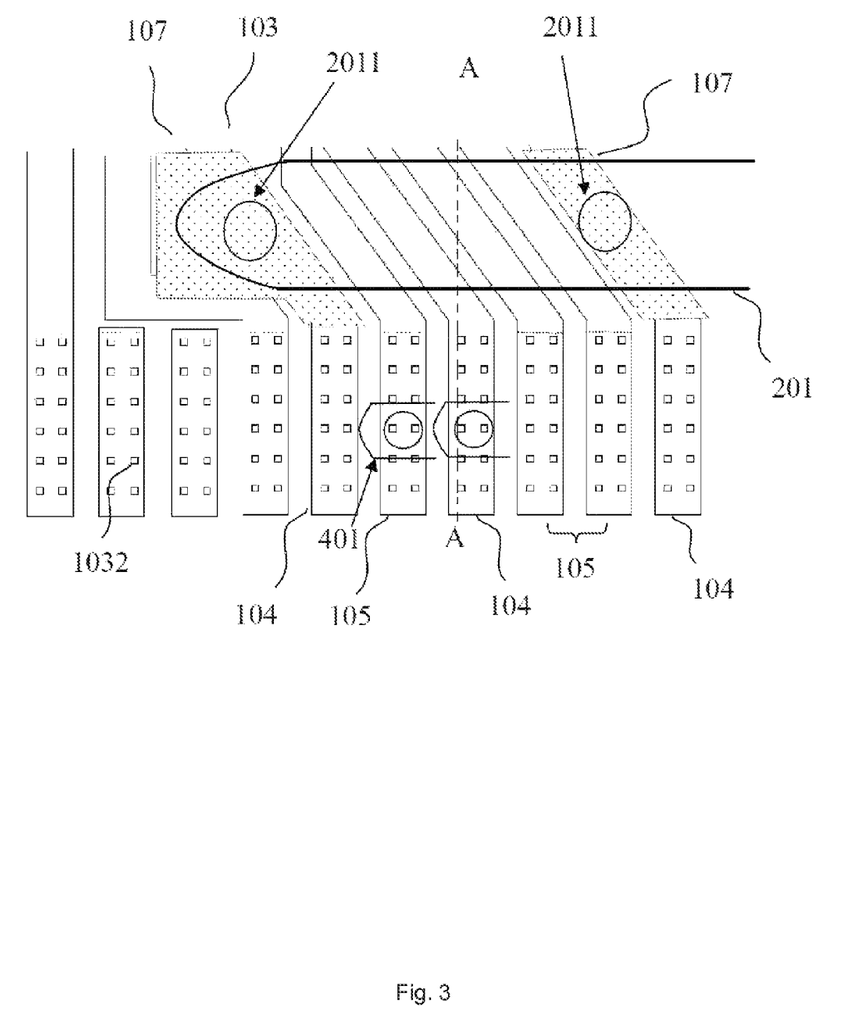
FIG. 3 is a top view of pins of an in-cell touch panel according to an embodiment of the invention.
Figure 6:
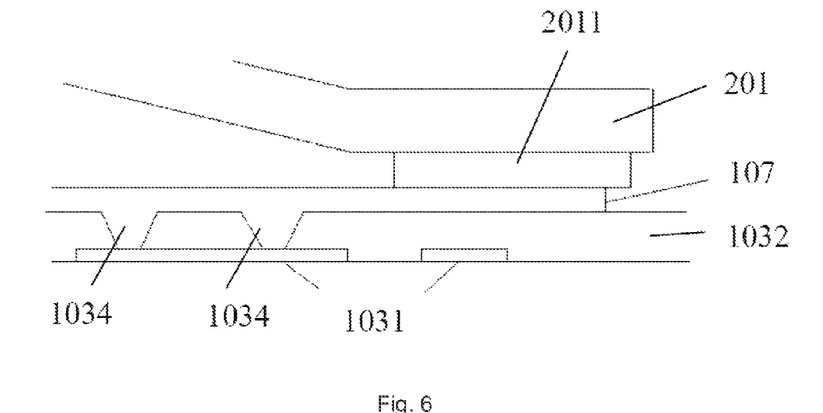
FIG. 6 is a cross-section view taken along A-A of FIG. 3.

FIG. 3 is a top view of pins of an in-cell touch panel according to the present embodiment. Combined with FIG. 1, the in-cell touch panel 10 of the present embodiment includes: an array substrate 102; multiple signal lines arranged at one side of the array substrate 102, with the signal line including a transient lead 103 and a display pin 105 and a touch pin 104 connected with the transient lead 103, and an insulating layer being attached on the transient lead 103. Some improvements are made to the transient leads 103 corresponding to the touch pins 104. Reference is further made to FIG. 6, which is a cross-section view taken along A-A of FIG. 3. The transient leads 103 corresponding to a part of touch pins 104 are provided with first wires 107 thereon. The transient lead 103 includes a metal electrode 1031 formed by a photo-mask process and an insulating layer 1032 formed on the metal electrode 1031, where the insulating layer 1032 is used to protect the metal electrode 1031. Further, a first through-hole 1034 is etched in the insulating layer 1032 on the metal electrode 1031 by a photo-mask process, and the first wire 107 is deposited on the insulating layer 1032, with the first wire 107 being electrically connected with the metal electrode 1031 of the transient lead 103 via the first through-hole 1034. Preferably, the material of the first wire 107 has an effect of electric conduction and anti-corrosion. In the present embodiment, the thickness of the insulating layer 1032 is 800 Å, and the thickness of the first wire 107 is 1000 Å; the material of the first wire 107 is indium tin oxide (ITO). Moreover, multiple first through-holes 1034 may be provided, so as to ensure that the electrical connection between the first wire 107 and the metal electrode 1031 can be achieved by other first through-holes 1034 in the case where a certain first through-hole 1034 does not expose the metal electrode 1031 due to incomplete etching of the insulating layer or in the case where the metal electrode 1031 is penetrated due to over-etching when forming a certain first through-hole 1034.

Moreover, the transient leads 103 provided with the first wires 107 are grouped into multiple test groups. Each test group includes the transient leads 103 corresponding to the adjacent multiple touch pins 104. The first wire 107 on the transient lead 103 at one outermost end of a same test group is widened, that is, this first wire 107 is wider than the first wires 107 on the transient leads 103 in the middle of the test group. In the present embodiment, the first wire 107 on the transient lead 103 at one outermost end of a same test group is widened, that is, this first wire 107 is wider than the first wires 107 on the transient leads 103 in the middle of the test group, therefore, it is convenient to identify the testing position with the naked eyes and thus achieve the accurate alignment of the test board when testing.

In the present embodiment, the transient leads 103 corresponding to at least two touch pins 104 are provided with the first wires 107 thereon. For example, the transient leads 103 corresponding to spaced touch pins 104 may be provided with the first wires 107 thereon. When performing voltage testing, for the touch pins 104 which are provided with the first wires 107 on their corresponding transient leads 103, it is possible to use a first test board 201 with multiple first detection portions 2011 to test multiple transient leads 103 provided with the first wires 107 at the same time; and for the remaining touch pins 104 which are not provided with the first wires 107 on their corresponding transient leads 103, the first test board 201 is directly connected cooperatively with these touch pins 104, then a signal is applied to perform voltage testing. Since the transient leads 103 corresponding to a part of touch pins 104 are provided with the first wires 107 thereon, a part of touch pins 104 to be tested can be transferred to the transient leads 103 corresponding to this part of touch pins 104, thus the number of the touch pins 104 on which the test is directly performed may be significantly reduced, which brings convenience to both of the practical detection operation and the design of the first test board 201. In which, the first test board 201 is made from ITO coating film. Since the metal electrode of the transient lead 103 corresponding to the display pin 105 is provided with an insulating layer thereon, even if the area of the first test board 201 is increased, when the first test board 201 is pressed onto the transient leads 103 corresponding to the touch pins 104, some transient leads 103 corresponding to the display pins 105 may be pressed at the same time, the problem of short circuit between the pins can be avoided due to the presence of the insulating layer. In the above case, when the transient leads 103 corresponding to the display pins 105 are pressed, although the parasitic capacitance produced by the display pin increases, the impact on the detection of the touch pins 104 that is caused by the parasitic capacitance may be negligible since the value of the parasitic capacitance practically produced is small.

Moreover, in the voltage testing on the touch pins 104, when the touch pins 104 or the transient leads 103 corresponding to the touch pins 104 are pressed, a second test board 401 including a second detection portion is further needed to press any one of the display pins 105. As the pin structure described in the prior art, both the contact region of each touch pin 104 with the detection portions of the test board and the contact region of each display pin 105 with the detection portions of the test board are formed from ITO conductive material.

The electrical failures occurred in the testing for a touch panel may include an open circuit of a touch electrode, a weak connection of a touch electrode, a short circuit between touch electrodes and so on. Specifically, the open circuit of the touch electrode and the short circuit of the touch electrode may be detected by monitoring the value of capacitance between the touch pin and the common electrode. If the value of the capacitance is too small, then the touch electrode may be open-circuited; and if the value of the capacitance is too large, then the touch electrode may be short-circuited. The weak connection of the touch electrode is mainly detected by detecting the magnitude of noise on a sensing electrode when a voltage is applied to a driving electrode.

Figure 7:
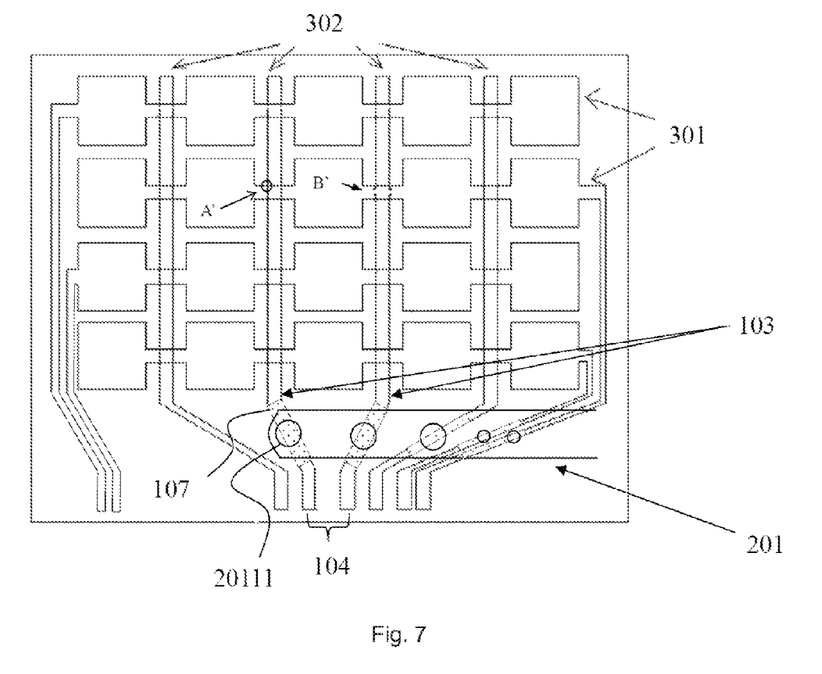
FIG. 7 is a top view of the structure of an in-cell touch panel according to the embodiments of invention.

FIG. 7 is a top view of the structure of the in-cell touch panel of the invention, which illustrates the specific voltage testing way for the touch pins. In the structure of the present embodiment, the transient leads 103 corresponding to the touch pins 104 are provided with the first wire 107 thereon. Since driving electrodes 301 and sensing electrodes 302 connected with each touch pins 104 have the same physical structure and the transient leads 103 corresponding to each touch pins 104 are close, these transient leads 103 provided with the first wires 107 may be grouped into multiple test groups. A first test board 201 is adopted to perform the test. The first test board 201 includes multiple test portions 2011, and the test portions 2011 of the first test board 201 are pressed onto the first wires on transient leads of the test groups to test the value of the capacitance. If there is one broken wire in the sensing electrodes (or the driving electrodes), as shown at B' in the figure, the measured capacitance value will be significantly small. If the measured capacitance value is significantly large, then a short circuit problem may exist between the driving electrode 301 and the sensing electrode 302, as shown at A' in the figure. Therefore, in the present embodiment, by providing the first wires on the transient leads corresponding to the touch pins, and using the first test board to test multiple transient leads at the same time, it is easy to detect the problem of the touch electrode in the touch panel; also it is easier to design the test board due to the increased testing space. Further, if a case of short/open circuit is excluded by detecting, then the problem of weak connection may be determined by applying an electrical signal to the driving electrode 301 and reading the magnitude of noise on the signal received from the sensing electrode 302, and if the noise is large, then the measured current value fluctuates wildly and is unstable, thus the problem of weak connection exists.

Another Embodiment

Figure 4:
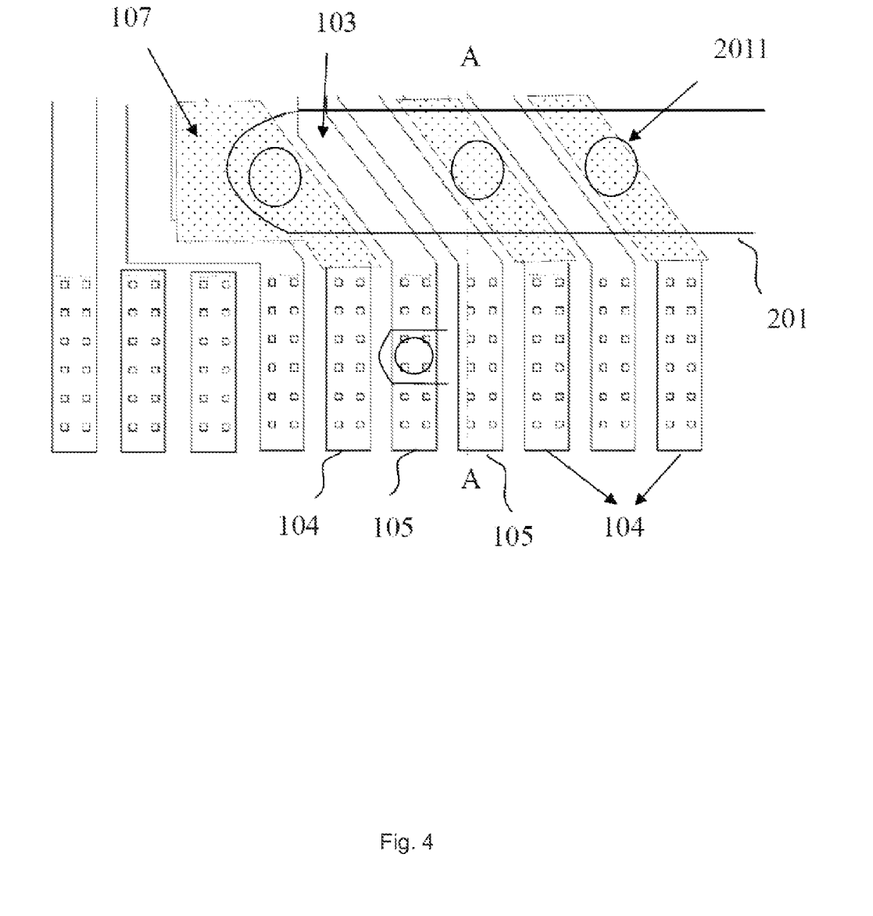
FIG. 4 is a top view of pins of an in-cell touch panel according to another embodiment of the invention.

Referring to FIG. 4, which is a top view of pins of an in-cell touch panel according to another embodiment of the invention, together with FIG. 1, the in-cell touch panel 10 of the present embodiment includes: an array substrate 102; and multiple signal lines arranged at one side of the array substrate 102, with the signal line including a transient lead 103, and a display pin 105 and a touch pin 104 connected with the transient lead 103; and an insulating layer being attached on the transient lead 103. Some improvements are made to the transient leads 103 corresponding to the touch pins 104. Specifically, reference is further made to FIG. 6, which is a cross-section view taken along A-A of FIG. 3, the transient leads 103 corresponding to all of the touch pins 104 are provided with the first wires 107 thereon. The transient lead 103 includes a metal electrode 1031 formed by a photo-mask process and an insulating layer 1032 formed on the metal electrode 1031, and the insulating layer 1032 is used to protect the metal electrode 1031. Further, a first through-hole 1034 is etched in the insulating layer 1032 on the metal electrode 1031 with a photo-mask process, and the first wire 107 is deposited on the insulating layer 1032, with the first wire 107 being electrically connected with the metal electrode 1031 of the transient lead 103 via the first through-hole 1034. Preferably, the material of the first wire 107 has an effect of electric conduction and anti-corrosion. In the present embodiment, the thickness of the insulating layer 1032 is 800 Å, and the thickness of the first wire 107 is 1000 Å; the material of the first wire 107 is indium tin oxide (ITO). Moreover, multiple first through-holes 1034 may be provided, so as to ensure that the electrical connection between the first wire 107 and the metal electrode 1031 can be achieved by other first through-holes 1034 in the case where a certain first through-holes 1034 does not expose the metal electrode 1031 due to incomplete etching of the insulating layer or in the case where the metal electrode 1031 is penetrated due to over-etching when forming a certain first through-hole 1034.

Moreover, the transient leads 103 provided with the first wires 107 are grouped into multiple test groups. Each test group includes the transient leads 103 corresponding to multiple adjacent touch pins 104. The first wire 107 on the transient lead 103 at one outermost end of a same test group is widened, that is, the width of this first wire 107 is larger than that of the first wires 107 on the transient leads 103 in the middle of the test group. In the present embodiment, the first wire 107 on the transient lead 103 at one outermost end of a same test group is widened, that is, the width of this first wire 107 is larger than that of the first wires 107 on the transient leads 103 in the middle of the test group, therefore, it is convenient to identify the testing position with the naked eyes and thus the accurate alignment of the test board is achieved when testing.

The structure of the second embodiment described above differs from the structure of the first embodiment in that the transient leads 103 corresponding to all of the touch pins 104 are provided with the first wires 107 thereon. For the in-cell touch panel with this structure, when performing the voltage testing on the touch pins 104, the transient leads 103 corresponding to all of the touch pins 104 are pressed to perform the test; and the transient leads 103 corresponding the touch pins 104 are grouped into multiple test groups, each of the test groups includes multiple transient leads 103. When testing, a first test board 201 with multiple first detection portions 2011 is adopted to simultaneously press a group of transient leads to perform the test, so as to further reduce the difficulty in voltage testing for pins of the in-cell touch panel, and improve the testing accuracy significantly. Since there is no need to press the touch pins with smaller testing space, the difficulty in designing of the test board is reduced, and the testing convenience is improved. Specifically, in order to clearly distinguish the position of each test group with the naked eyes, in the present embodiment, the first wire 107 on the transient lead 103 at one outermost end of a same test group is widened, that is, the width of this first wire 107 is larger than that of the first wires 107 on the transient leads 103 in the middle of the test group. Specifically, the width of the first wire 107 on each transient leads 103 in the middle of the test groups is 500 Å to 3000 Å; and for the transient lead at one outermost end of the test group, the width of the first wire 107 thereof is 180 µm to 220 µm.

Another Embodiment

Figure 5:
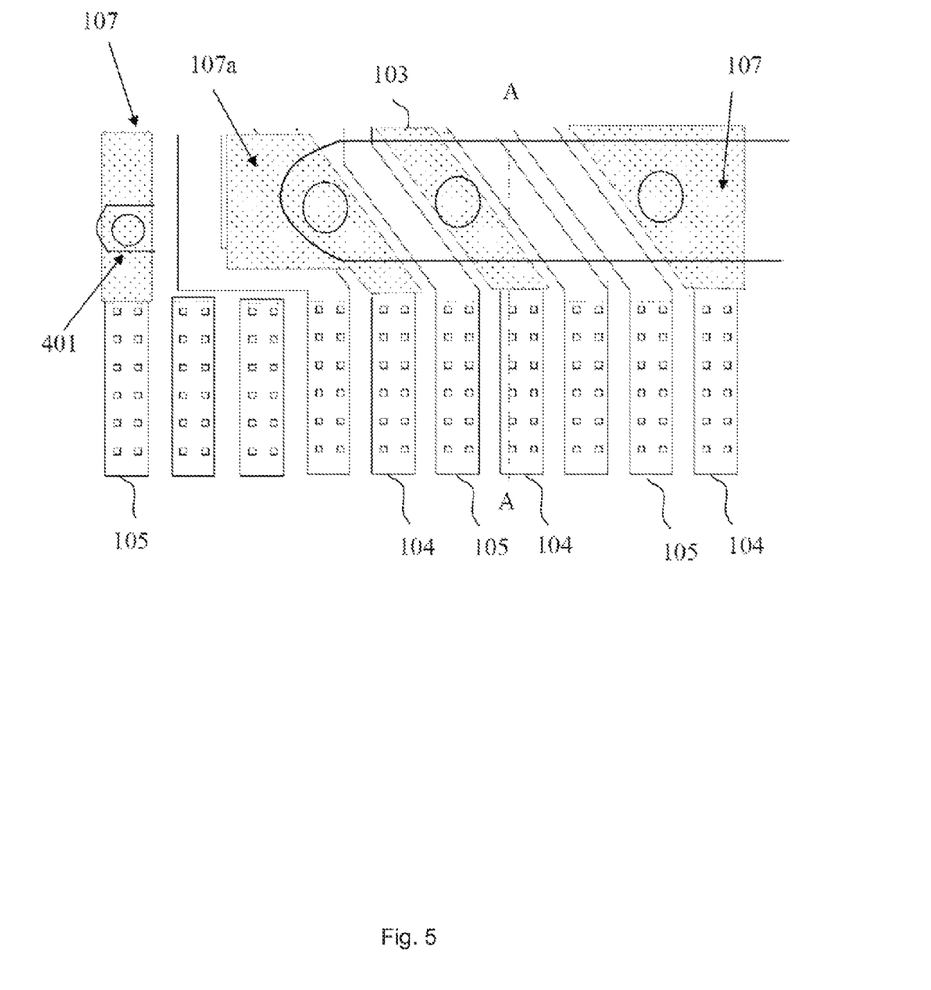
FIG. 5 is a top view of pins of an in-cell touch panel according to another embodiment of the invention.

Referring to FIG. 5, which is a top view of pins of an in-cell touch panel according to another embodiment of the invention, together with FIG. 1, the in-cell touch panel 10 of the present embodiment includes: an array substrate 102; and multiple signal lines arranged at one side of the array substrate 102, with the signal line including a transient lead 103, a display pin 105 and a touch pin 104 connected with the transient lead 103; and an insulating layer being attached on the transient lead 103. Some improvements are made to the transient leads 103 corresponding to the touch pins 104 and the transient leads 103 corresponding to the display pins 105. Reference is further made to FIG. 6, which is a cross-section view taken along A-A of FIG. 3, the transient leads 103 corresponding to all of the touch pins 104 and the transient lead 103 corresponding to one display pin 105 are provided with the first wires 107 thereon. The transient lead 103 includes a metal electrode 1031 formed by a photo-mask process and an insulating layer 1032 formed on the metal electrode 1031, and the insulating layer 1032 is used to protect the metal electrode 1031. Further, a first through-hole 1034 is etched in the insulating layer 1032 on the metal electrode 1031 with a photo-mask process, and the first wire 107 is deposited on the insulating layer 1032, with the first wire 107 being electrically connected with the metal electrode 1031 of the transient lead 103 via the first through-hole 1034. Preferably, the material of the first wire 107 has an effect of electric conduction and anti-corrosion. In the present embodiment, the thickness of the insulating layer 1032 is 800 Å, and the thickness of the first wire 107 is 1000 Å; the material of the first wire 107 is indium tin oxide (ITO). Moreover, multiple first through-holes 1034 may be provided, so as to ensure that the electrical connection between the first wire 107 and the metal electrode 1031 can be achieved by other first through-holes 1034 in the case where a certain first through-holes 1034 does not expose the metal electrode 1031 due to incomplete etching of the insulating layer or in the case where the metal electrode 1031 is penetrated due to over-etching when forming a certain first through-hole 1034.

Moreover, the transient leads 103 provided with the first wires 107 are grouped into multiple test groups. Each test groups includes the transient leads 103 corresponding to multiple adjacent touch pins 104, in which the first wire 107 on the transient lead 103 at one outermost end of a same test group is widened, that is, the width of this first wire 107 is wider than that of the first wire 107s on the transient leads 103 in the middle of the test group. In the present embodiment, the first wires 107 on the transient lead 103 at two outermost ends of a same test group is widened, that is, these two first wires 107 are wider than the first wires 107 on the transient leads 103 in the middle of the test group, therefore, it is convenient to identify the testing position with the naked eyes and thus achieve the accurate alignment of the test board when testing.

The structure of the third embodiment described above differs from the structure of the first embodiment in that the transient leads 103 corresponding to all of the touch pins 104 and the one display pin 105 are provided with the first wires 107, and the first wires 107 on the transient leads 103 at the two outermost ends of a same test group are widened.

For the in-cell touch panel with this structure, when performing the voltage testing on the touch pins 104, the transient leads 103 corresponding to all of the touch pins 104 are pressed to perform the test, and the transient lead 103 corresponding to the display pin 105 is also pressed at a corresponding voltage testing position, so as to further reduce the difficulty in voltage testing for pins of the in-cell touch panel, and improve the testing accuracy significantly. Since there is no need to press the touch pins and the display pins with smaller testing space, the difficulty in designing the test board is reduced, and the testing convenience is improved. Moreover, the first wires 107 on the transient leads 103 at the outermost ends of each test group are widened, that is, the width of these first wires 107 is larger than that of the first wires 107 on the transient leads 103 in the middle of each test group, and is increased to for example 180 µm to 220 µm, so that it is easy to identify the position of each test group with the naked eyes and make the testing alignment more convenient.

Similarly, the arrangement manner that the first wire is provided on the transient lead corresponding to the touch pin and the arrangement manner that the first wire is provided on the transient lead corresponding to the display pin may be exchanged, that is, it is possible to provide the first wires on the transient leads corresponding to part or all the display pins, rather than on the transient leads corresponding to part or all the touch pins, to achieve the goal of testing the display pins simply.

The in-cell touch panel of the invention can be applied to a touch panel structure using an In-Plane Switching (IPS) or Fringe Field Switching (FFS) mode.

Obviously, various variations and modifications can be made to the invention by those skilled in the art without deviation from the spirit and scope of the invention. In this way, as long as these variations and modifications of the invention are within the scope of the claims of the invention and the equivalent technique thereof, the invention is also intended to include these variations and modifications.

What is claimed is:

1. An in-cell touch panel, comprising:
   an array substrate;
   a plurality of signal lines arranged at one side of the array substrate, each signal line comprising a transient lead and either a display pin or a touch pin;
   an insulating layer covering the transient lead of each of the plurality of signal lines; and
   first wires formed on the insulating layer, wherein the touch pins are spaced by the display pins and wherein the first wires are only electrically connected with the transient leads connected with the touch pins, via first through-holes in the insulating layer;
   a plurality of test groups, wherein each test group comprises a plurality of transient leads, and the first wires at an outermost ends in each test group are wider than the other first wires in the same test group; and
   second wires formed on the display pins and the touch pins, the second wires being electrically connected with the display pins and the touch pins, respectively, via second through-holes in the insulating layer on the display pins and second through-hole in the insulating layer on the touch pins.

2. The in-cell touch panel according to claim 1, wherein the transient leads comprise at least two first through-holes.

3. The in-cell touch panel according to claim 1, wherein the transient leads corresponding to at least two touch pins are connected with the first wires.

4. The in-cell touch panel according to claim 3, wherein the transient leads corresponding to all of the touch pins are connected with the first wires.

5. The in-cell touch panel according to claim 1, wherein transient leads corresponding to at least three adjacent touch pins are grouped into one test group, and the width of the first wires on the transient leads at the outermost ends of the test group is larger than the width of the first wires on the transient leads in the middle of the test group.

6. The in-cell touch panel according to claim 5, wherein the width of the first wires on the transient leads in the middle of the test group ranges from 500 Å to 3000 Å.

7. The in-cell touch panel according to claim 5, wherein the width of the first wires on the transient leads at the outermost ends of the test group ranges from 180 µm to 220 µm.

8. The in-cell touch panel according to claim 1, wherein the first wires are made from anticorrosive conductive material.

9. The in-cell touch panel according to claim 6, wherein the material of the first wires is indium tin oxide.

10. A voltage testing method for the in-cell touch panel according to claim 1, comprising:
    providing a plurality of first test boards, the first test board each comprising a first detection portion;
    connecting the first detection portion with the first wire on a corresponding transient lead; and
    applying a signal to the first wire to perform voltage testing.

11. The voltage testing method for the in-cell touch panel according to claim 10, wherein each of the first test boards comprises a plurality of first detection portions.

12. The voltage testing method for the in-cell touch panel according to claim 10, further comprising:
    providing a second test board, the second test board comprising a second detection portion; and
    connecting the second detection portion with a corresponding display pin and applying a signal to the display pin.

13. The voltage testing method for the in-cell touch panel according to claim 10, further comprising:
    providing a second test board, the second test board comprising a second detection portion, the transient lead corresponding to the display pin being provided with the first wire thereon;
    connecting the second detection portion with the first wire on the transient lead corresponding to a corresponding display pin; and
    applying a signal to the first wire provided on the transient lead corresponding to the display pin.

* * * * *